INVENTOR
JOSEPH YAMRON
BY Donald F. Bradley
AGENT

Aug. 9, 1966 J. YAMRON 3,266,052
GUIDANCE SYSTEM TEST APPARATUS
Filed Aug. 31, 1961 8 Sheets-Sheet 2

INVENTOR
JOSEPH YAMRON
BY Donald J. Bradley
AGENT

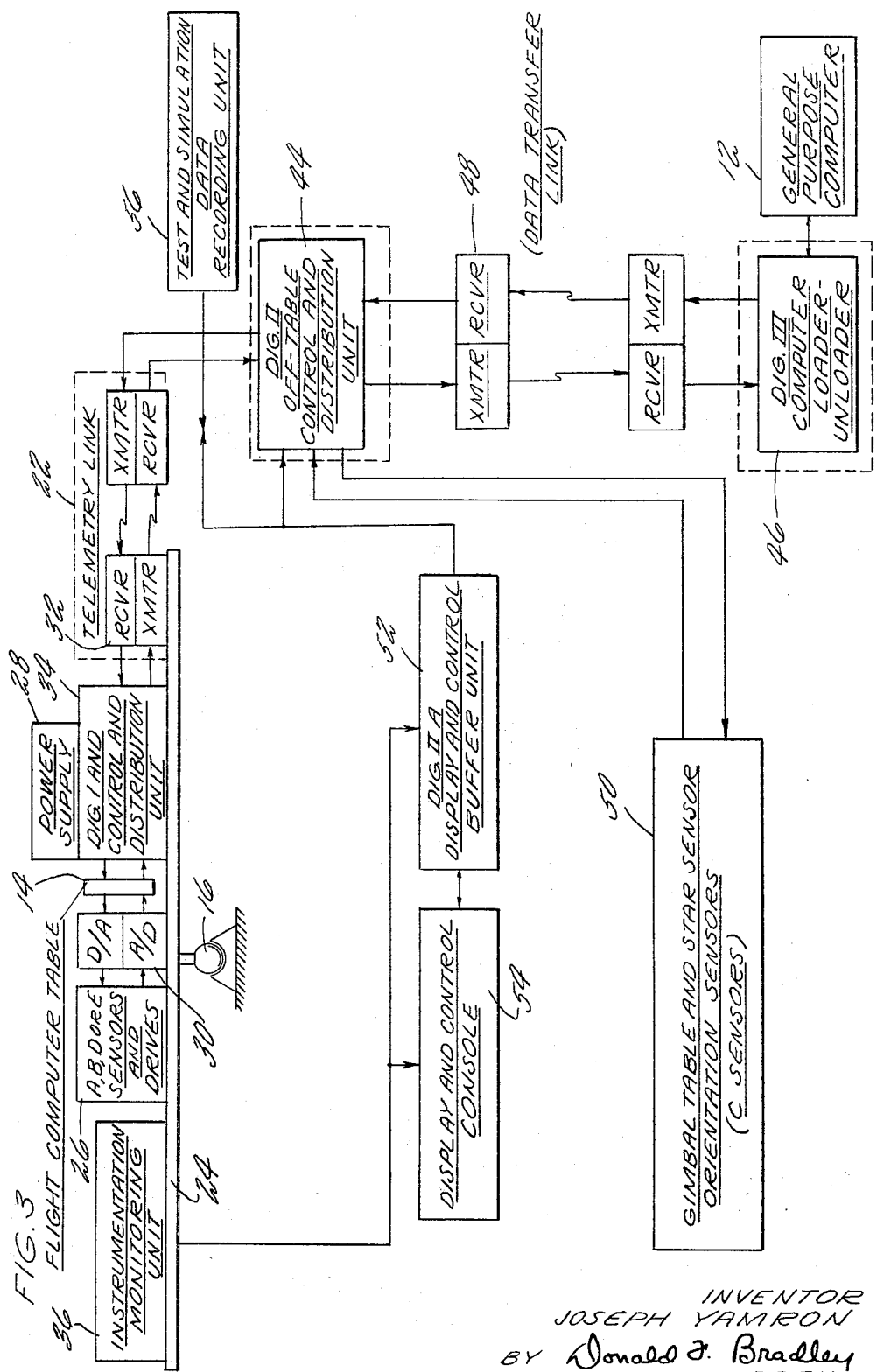

INVENTOR
JOSEPH YAMRON
BY Donald F. Bradley
AGENT

INVENTOR
JOSEPH YAMRON
BY Donald J. Bradley
AGENT

United States Patent Office 3,266,052
Patented August 9, 1966

1

3,266,052
GUIDANCE SYSTEM TEST APPARATUS
Joseph Yamron, West Hartford, Conn., assignor to United Aircraft Corporation, East Hartford, Conn., a corporation of Delaware
Filed Aug. 31, 1961, Ser. No. 135,348
6 Claims. (Cl. 73—1)

This invention relates to a novel testing apparatus for development and evaluation of missile and space vehicle guidance systems. More specifically this invention precisely simulates test conditions for guidance systems.

The novel testing apparatus and system may be considered as the major component of a laboratory for the development and testing of guidance systems. The laboratory provides a flight simulation environment in which the over-all performance of missileborne guidance and control systems can be accurately studied by isolating the major factors within these systems which contribute to performance degradation and thus permitting evaluation of design changes. As an accurate test facility, the laboratory can be used to develop methods of testing guidance system alignment, performance and calibration as well as having a capability for assessing advanced guidance system designs. In addition, the laboratory will be useful in establishing realistic test methods for production of guidance and control systems.

The heart of the testing system is a three degree of freedom flight simulation platform in combination with a stellar radiation simulator. Operation of the testing system requires a closed loop real time control system including high speed computational facilities to simulate the various phases of a space vehicle mission profile.

It is therefore an object of this invention to provide a novel testing system for guidance systems.

Another object of this inventon is to provide novel testing apparatus for space vehicle guidance and attitude control systems.

A further object of this invention is to provide a novel three degree of freedom attitude simulation platform utilizing a novel following system to provide accurate indications of the table position.

Another object of this invention is to provide a novel test apparatus for testing a stellar inertial guidance system.

A further object of this invention is apparatus to simulate and assess advanced guidance system designs.

These and other features and advantages will be apparent from the specification and claims, and from the accompanying drawings which illustrate an embodiment of the invention.

Figure 2:
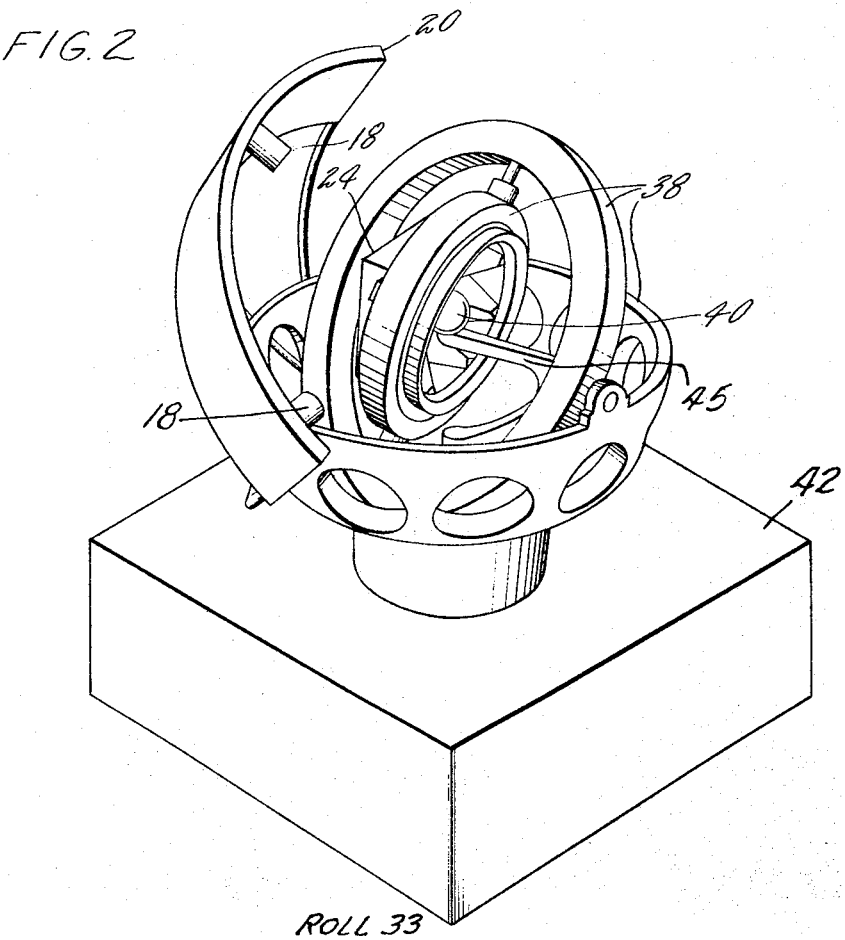
FIG. 2 shows the flight simulation platform and associated equipment.
Figure 2A:
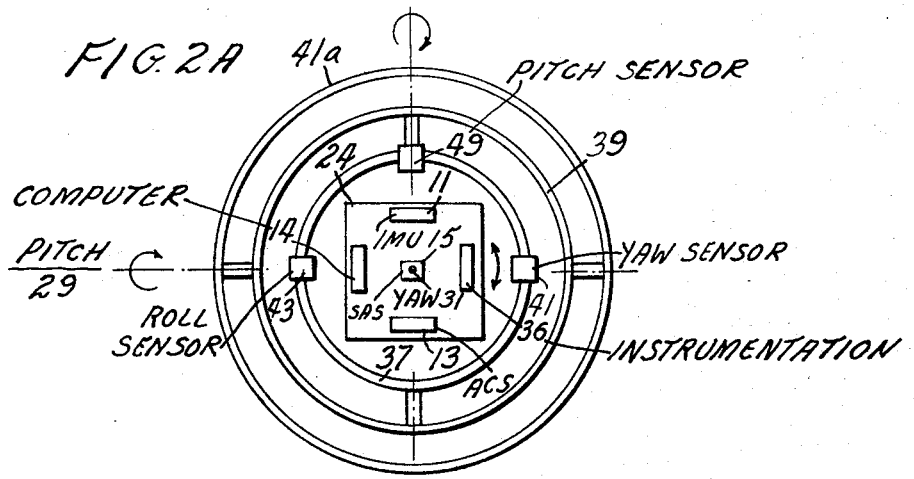
Figure 4:
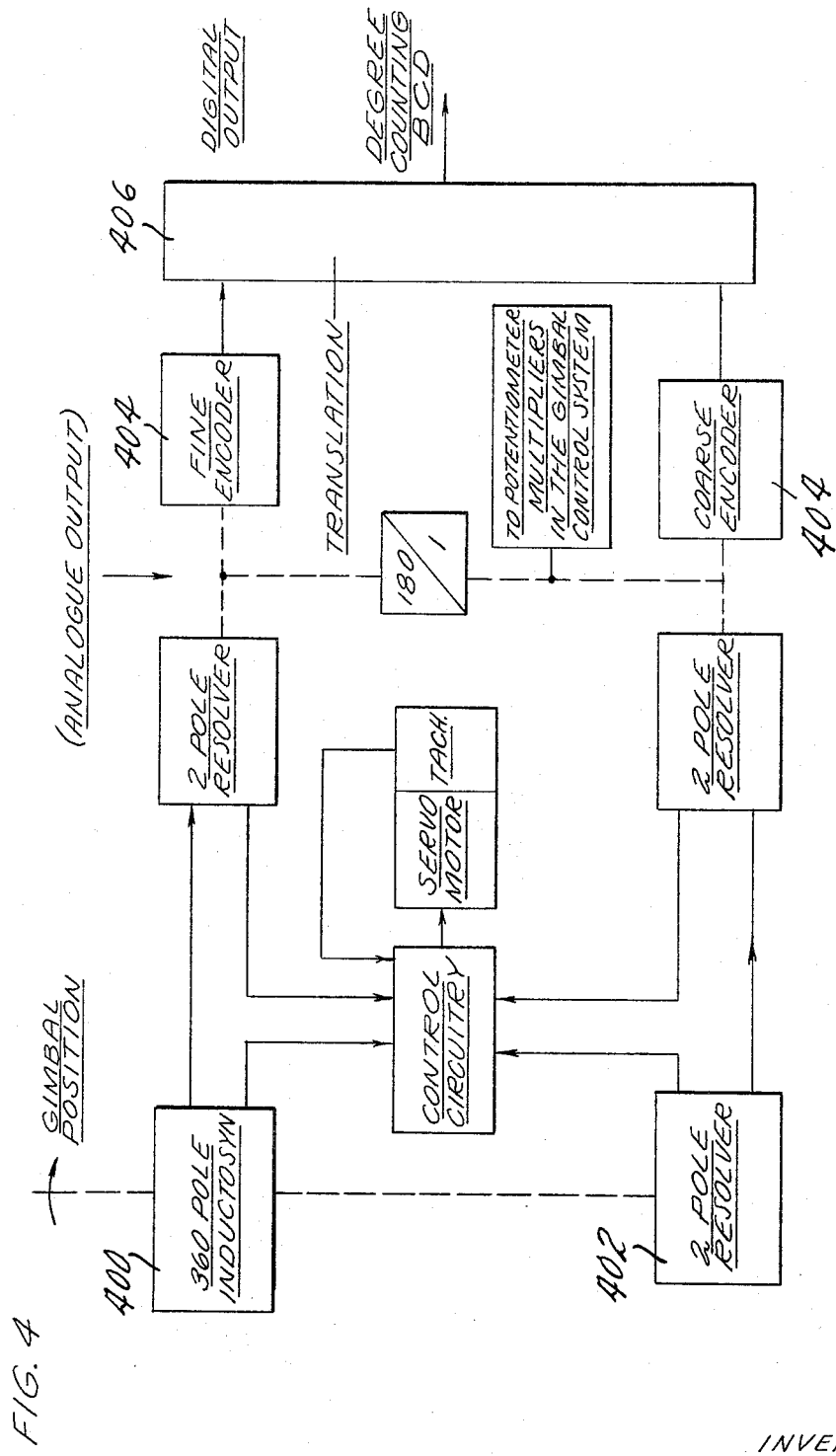
Figure 5:
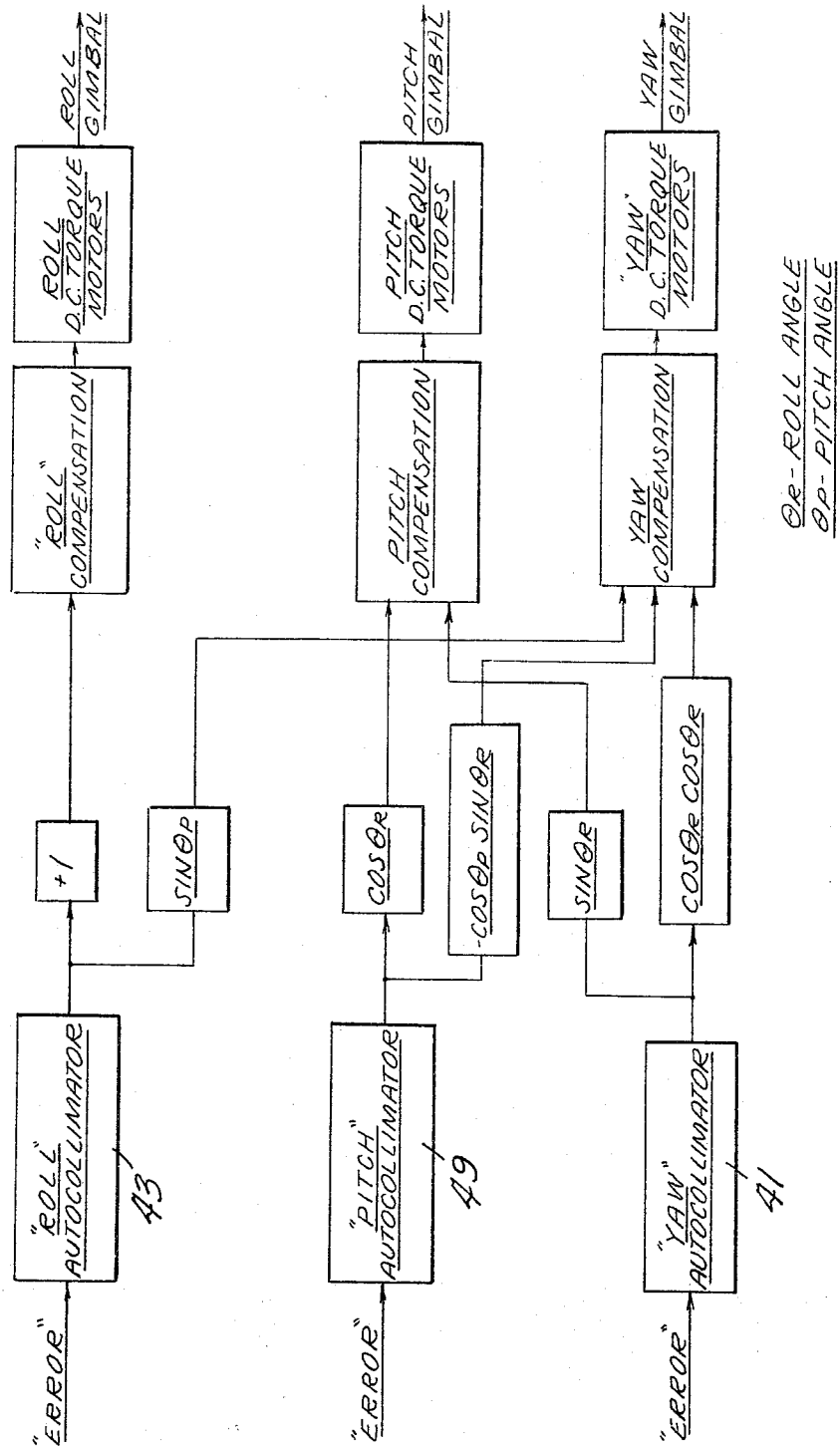
Figure 6:
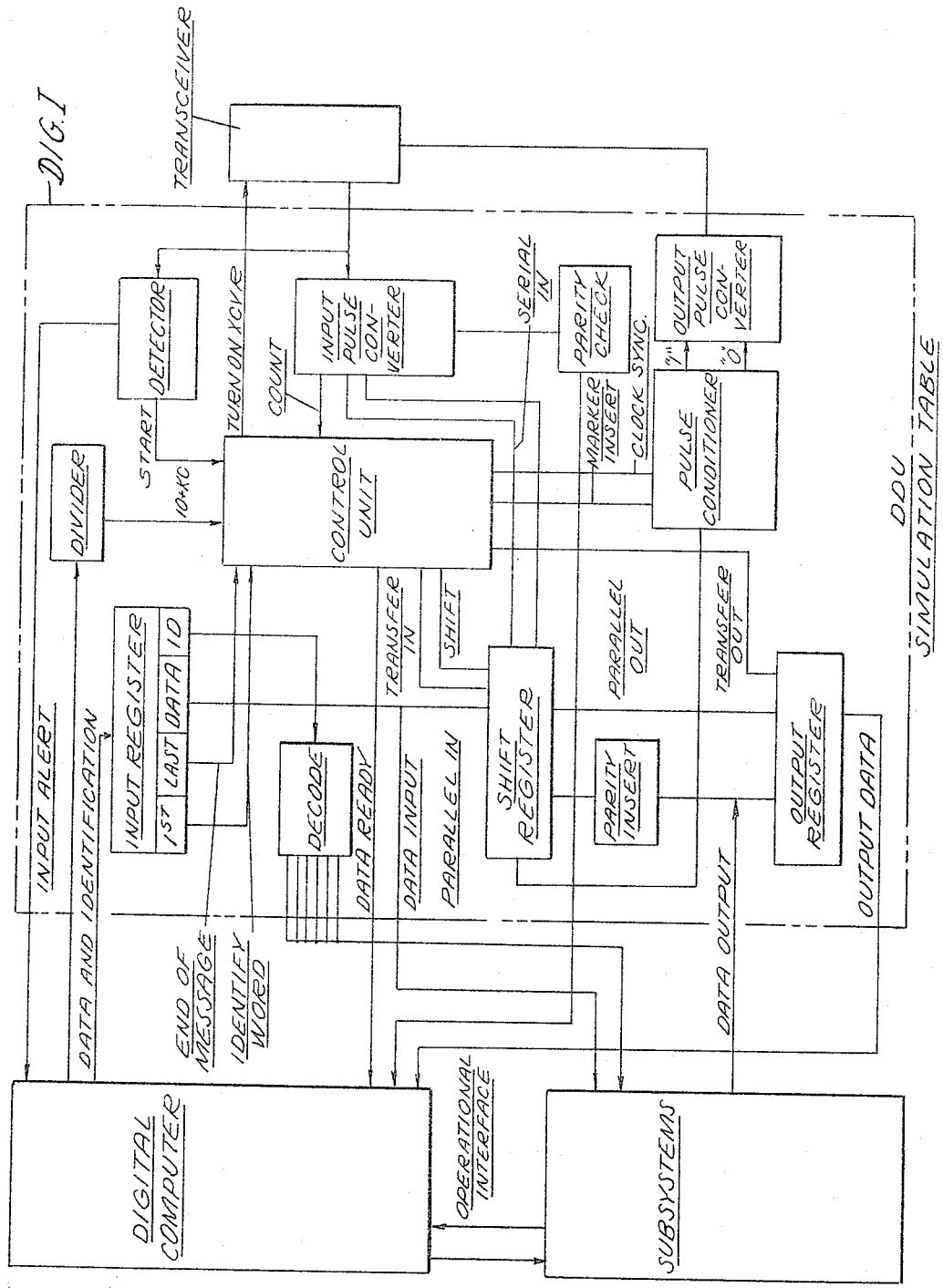
Figure 7:
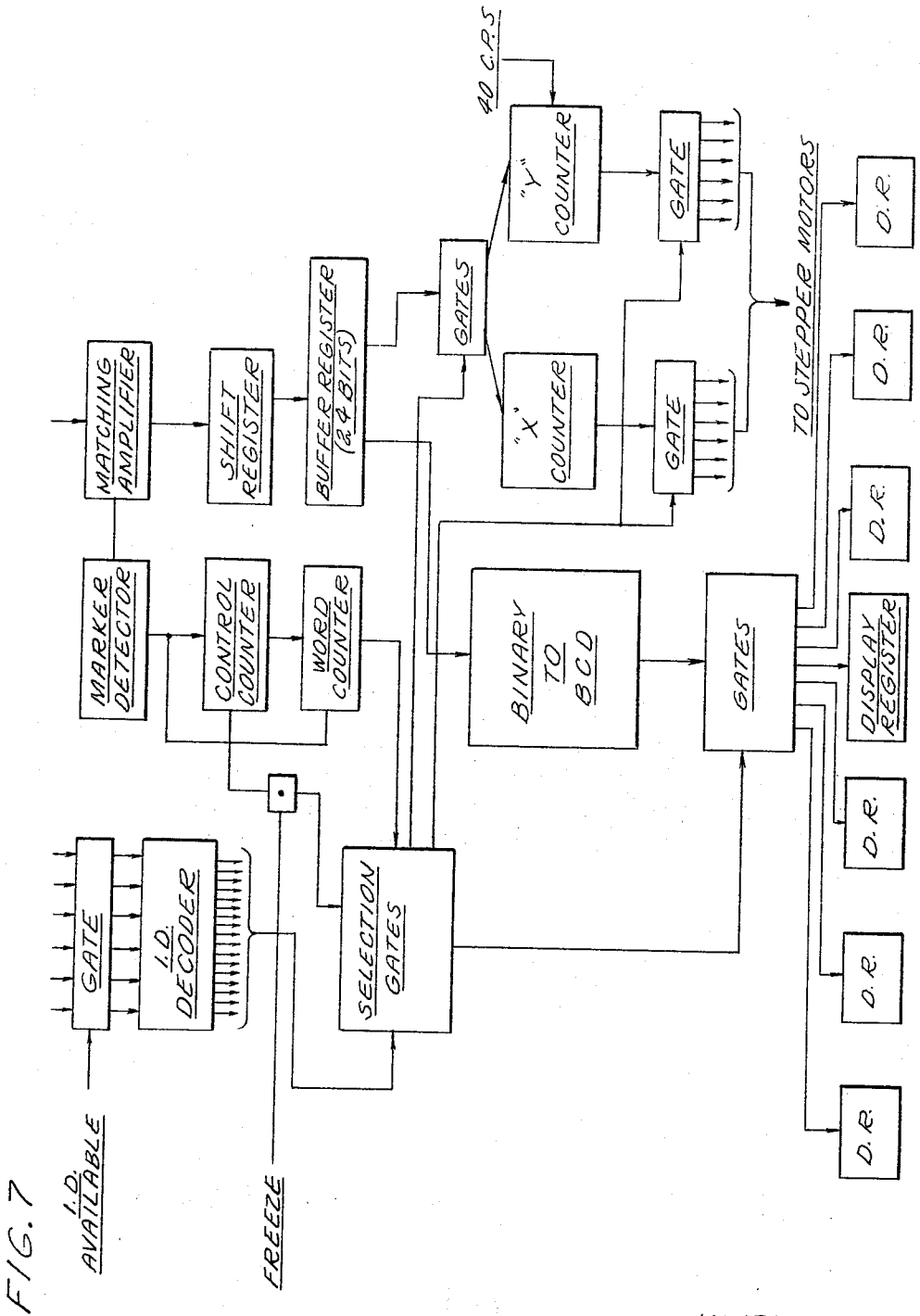
Figure 8:
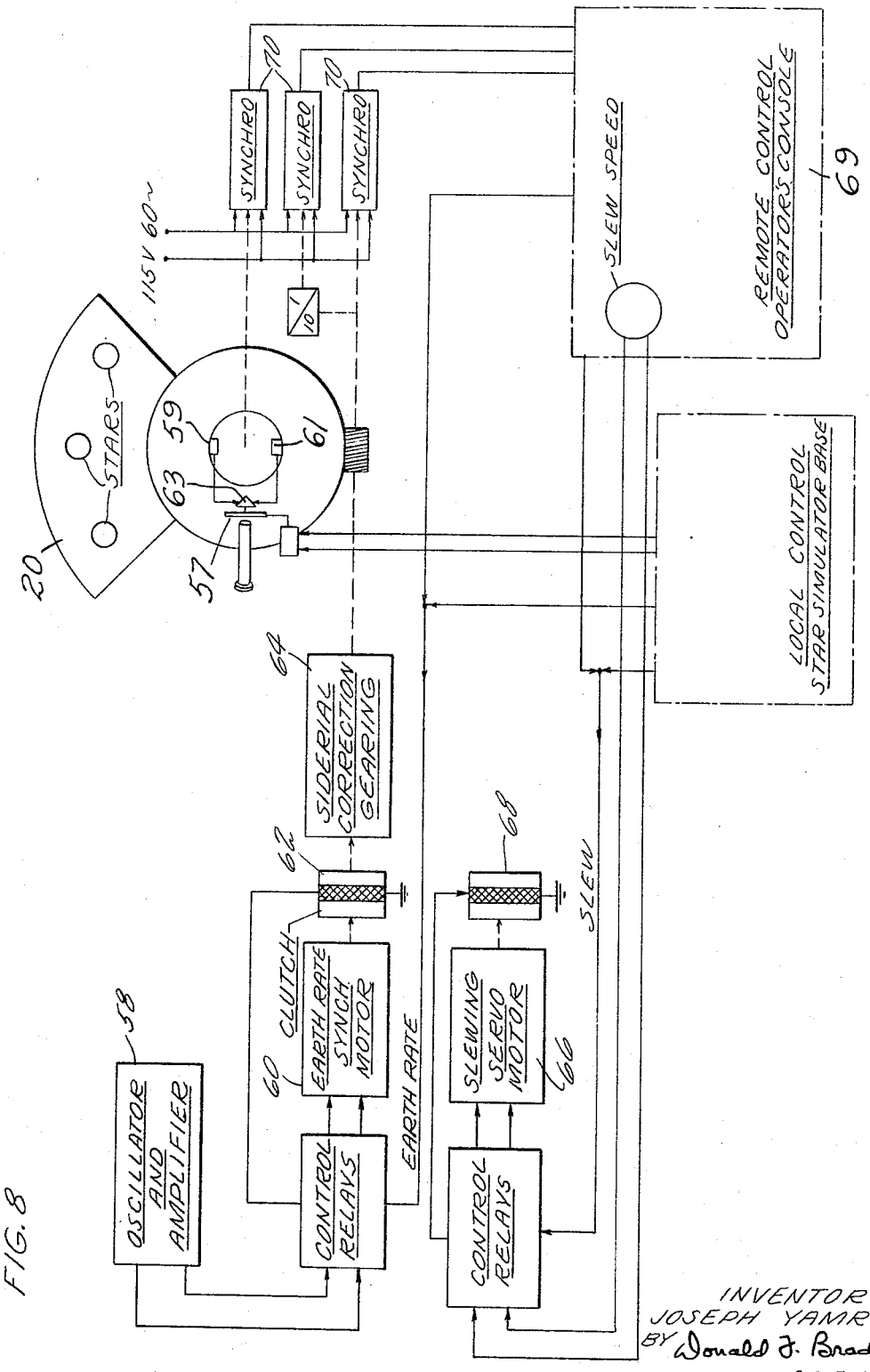

FIG. 2A is a top view of a flight simulation platform to show the mounting locations of the autocollimators and a typical guidance system under test; and FIG. 3 is a block diagram showing the system of this invention and real time data handling system and associated equipment; and FIG. 4 is a block diagram of the electrical readout system for one of the three axes of the flight simulation gimbal system; and FIG. 5 is a block diagram showing the three-axis autocollimator gimbal follow-up system; and FIG. 6 is a block diagram of Dig. I, the digital equipment on board the simulation platform; and FIG. 7 is a block diagram of Dig. II, the digital equipment for display; and FIG. 8 is a block diagram of the star simulator.

2

In the testing system, a general purpose digital computer not mounted on the platform provides computational support and control signals necessary for a flight computer which is on the platform. The flight computer programs the guidance system through the test and provides signals for an attitude control system that continuously positions the flight simulation platform. A gimbal system accurately follows the platform without physically contacting it and provides a continuous readout of the platform attitude to permit analysis of the accuracy of the guidance system. A stellar radiation simulator further provides inertial testing of a guidance system. Through a comparison between the mathematical model of the programmed attitutde with the gimbal readout signals, errors may be defined. With this equipment various guidance flight modes may be simulated.

Figure 1:
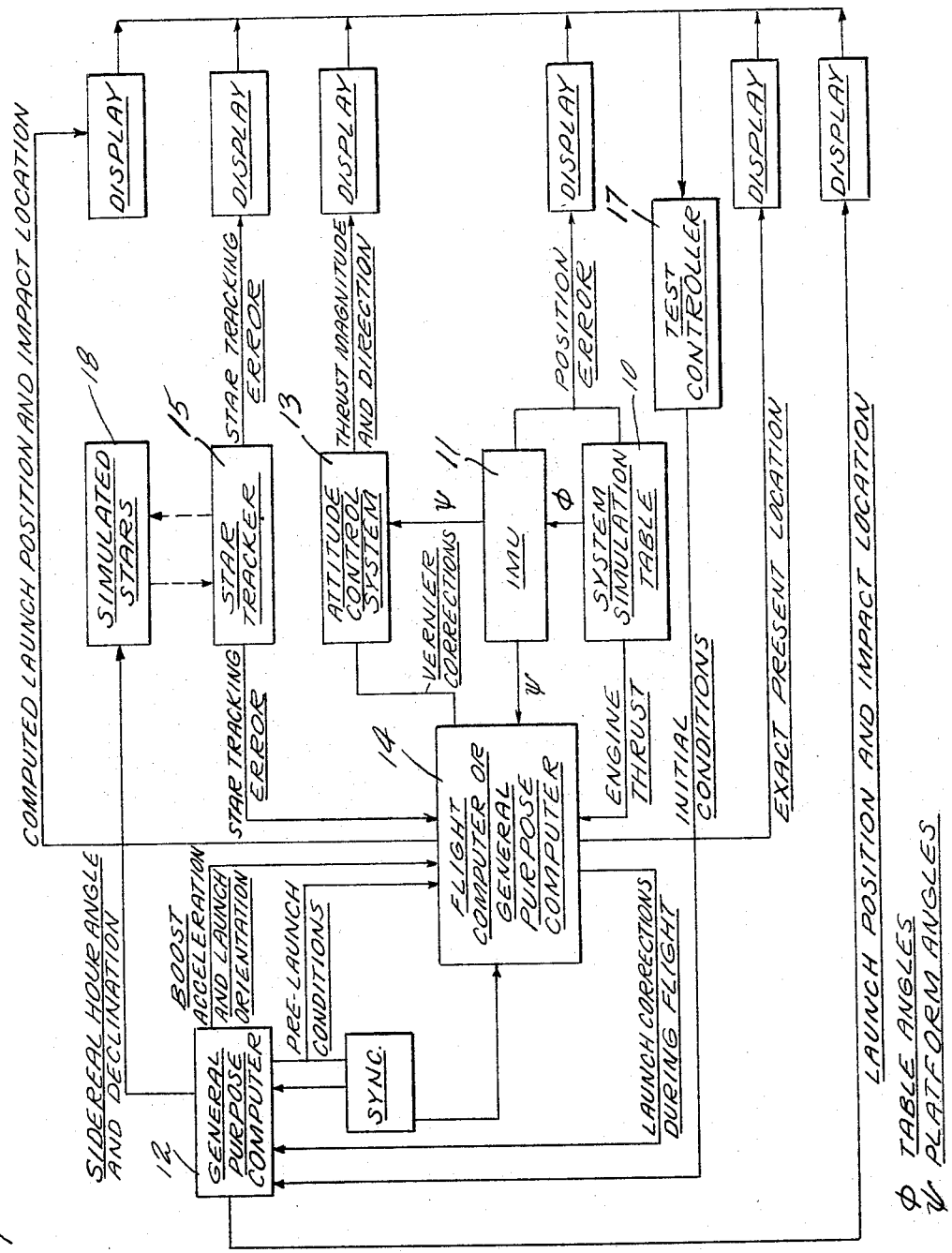
FIG. 1 is a functional block diagram showing the system of this invention.

A functional block diagram illustrating the inter-relationships of the guidance system, the computers, and the simulation table is shown in FIG. 1. An inertial measurements unit (IMU) an attitude control system 13, and a flight computer 14 are mounted on a platform 24. The inertial measurements unit 11 may be the sole system under test or the attitude control system 13 together with the flight computer 14 may form an integral guidance and attitude control system to be tested by this invention. A start simulator 18 is mounted on a member which rotates about the polar axis thereby removing the effects of earth rotation for all inertial testing of guidance equipment. For this reason, a star tracker is part of the equipment on the simulation platform but it could be an integral part of a stellar inertial guidance system to be tested. A test controller 17 is functionally shown separated from the flight computer 14 but may be an integral part thereof as part of its program. At the end of a test, errors detected such as star tracking, position, launch and impact errors are displayed. The information for these displays may either be generated by a general purpose computer 12 or by the flight computer 14.

As shown in FIG. 2 and FIG. 2a, the flight simulator is equipped to move 360° on the yaw axis 31, ±120° on the roll axis 33, and ±85° on the pitch axis 29. The platform 24 is supported on a single ten-inch diameter ball 40 which is floated on an air cushion provided through the L-shaped supporting member 45. The platform 24 may be balanced within 5 gm./cm. of unbalance. In order to accurately determine the position of the platform 24 without physically contacting it, it is surrounded by a three-gimbal structure 38.

The support pedestal 45 for the air bearing 40 has a curved upper end. The lower end of the support 45 is a straight shaft which is fitted into a precision compound bearing located in line with the air bearing center of rotation. In addition, this air bearing support 45 is motor driven about the vertical axis so as to keep the curved portion of the support pedestal exactly opposite to the maximum tilt of the platform 24 in a position of least mechanical interference.

The gimbal structure 38 permits any attitude of the platform 24 within its above-mentioned constraints but is not in direct contact with the platform 24. In order to accurately determine the position and direction of movement of the platform 24, the gimbal structure is designed to follow it. The inner gimbal 37, the roll axis gimbal, closely follows all of the attitudes of the platform 24 by means of an autocollimator system for sensing the position and movement of the platform about three axes, the yaw axis 31, the roll axis 33, and the pitch axis 29. Respectively, the autocollimator sensors are the yaw sensor 41, the roll sensor 43, and the pitch sensor 49.

Since the inner roll gimbal 37 is not allowed to come in physical contact with the platform 24, it will appear during an operation to move as a single unit with the platform. The autocollimator readout system for detecting movements of the table are very sensitive and have a range of operation of approximately ±15 minutes of arc. This is a maximum movement and within this range is a linear operating region of approximately ±20 seconds of arc for proportional control so that the inner roll gimbal may follow the position of the platform to within ± a half arc second and allow a gimbal readout system, to be hereafter described, to accurately indicate the platform 24 orientation.

The autocollimators 41, 43 and 49 are commercially available and may be of the type such as is disclosed in the patent to Falconi, No. 2,870,671. This type of system is well known as it provides a means for measuring the angular position of incident light. The mirror 26 shown in FIG. 1 of the Falconi patent is mounted on the platform 24 facing the autocollimators and therefore provides a measure of the relative angle between the platform 24 and the inner roll gimbal 37 upon which the autocollimators are mounted. To improve the sensitivity of this autocollimator system, it is not necessary to sense both azimuth and elevation as shown in Falconi and a single elevation detection would suffice for each axis.

Upon a detection of movement of the platform 24 about the three axes, error signals generated by the autocollimator system controls D.C. torque motors on the gimbal axes which maintain the desired gimbal position relative to the position of the platform 24. The power of the motors is sufficient to supply the accelerations necessary for following the platform 24. The resolution of the autocollimator error signals into commands for the gimbal torque motors is accomplished by conventional analog computer circuitry such as is functionally shown in FIG. 5.

The gimbal positions are an indication of the orientation of the platform 24 and therefore accurate resolver and inductance angular readout devices are provided on each of the gimbals axes to determine their orientation.

A typical gimbal angular measurement device is shown in FIG. 4. A well-known inductancent 400 coupled to a resolver 402 produces after translation to an encoder system 404 an accurate digital readout in binary coded decimal (BCD) format of the angular position of the gimbal. The BCD digital output 406 presents the angular data in degrees and decimal fractions of a degree. The data is stored in conventional flip-flop circuitry and may be sampled according to standard techniques at frequent intervals by the digital processing equipment hereafter described.

The testing of a stellar inertial guidance system is made possible with the use of a star simulator 20 on which precise collimators 18 are mounted. The star simulator rotates about an axis which is accurately aligned within several seconds of arc parallel to the polar axis and rotates at a sidereal rate about this axis to fix the simulated star positions with respect to inertial space. The number of stars required, their brightness, and relative positions are test parameters which may be varied according to the tests to be run. The starlight is produced by standard collimator sources. Different stars in the heavens may be simulated by locating the collimators and any desired place upon the simulator 20.

FIG. 8 shows a functional block diagram of the mechanism controlling the star simulator. Earth rate motion is obtained by use of a hysteresis synchronous drive motor 60 whose input power frequency is accurately maintained by means of a fork-tuned oscillator and amplifier 58. The motor torque output is coupled through a magnetic clutch 62 and sidereal correction gearing 64 to a worm drive gear which is directly connected to the polar axis of the star simulator 20. A manual or high speed slewing drive is provided by a 60-cycle servomotor 64 which is coupled through a magnetic clutch 68 to the same worm drive gear connected to the magnetic clutch 62. The slewing drive provides a variable relative motion between the simulated stars on the simulator 20 and the star sensing equipment on the platform 24. The star simulator may be rotated in both clockwise and counterclockwise directions by appropriate reversal of control signals at the remote console 69.

It is very important for proper test control purposes to ascertain the location of a simulated star relative to the inertial guidance system and stellar sensor located on the platform 24. Consequently, a positional readout of the simulator 20 position with respect to its polar axis is provided by three synchrotransmitters 70. In addition, a precise optical readout system accurate to within two seconds of arc about the polar axis and having a resolution of one second of arc is provided. This readout device 57 utilizes a dual coincidence presentation of a scale index with two sections 59 and 61 located opposite each other at 180°. Their images are presented adjacent to each other at the apex of a splitter prism 63. The scale index marks appear in the field of view as a single presentation separated by a line which is the apex of the splitter prism. The image of the scale lines from one of the viewing locations 59 or 61 can be caused to shift by changing the separation of a pair of wedges in the converging light path leading to the splitter prism 63. Attached to the wedge translating mechanism is a scale which also appears in the field of view below the composite scale image. This scale acts as a vernier to provide readability down to one second of arc.

FIG. 2a shows a typical guidance equipment under test and mounted on the platform 24. Thus a computer 14, a star angle sensor or tracker 15, an inertial measurement unit 11, an attitude control system 13 and an instrumentation package 36 for monitoring and storing performance criteria of the guidance system are mounted on platform 24. Optional digital equipment for communicating with off-platform equipment via a two-way radio frequency link is shown in FIG. 3.

FIG. 3 shows the interconnection between the guidance system and the digital computation facilities with instrumentation and display capability for monitoring and controlling a guidance system under test by use of a data link. To provide communication between the platform mounted guidance equipment and the digital equipment not located on the platform 24, a telemetry link 22 comprising a receiver and transmitter for two-way transmission of data is provided. The telemetry link communicates with an off-platform mounted digital equipment Dig. II, 44, which in turn is connected via an optional radio frequency network 48 to a general purpose computer 12. Interposed between the general purpose computer 12 and the radio frequency link 48 is a computer loader and unloader Dig. III, 46. Since the radio frequency paths involve serial flow of data, a digital equipment Dig. I, 34, is mounted on the platform to provide the serial-to-parallel and vice versa conversions necessary for communication with the flight computer 14.

As shown in FIG. 3, the previously described angular gimbal readout system and the star simulator readout 50 are connected to the Dig. II, 44, equipment. Since these readouts are provided in digital format, the information is made accessible to the general purpose computer 12 and the flight computer located on the platform 14.

The general purpose computer 12 may be used for real time control and computation of the guidance system as well as analyze its performance in response to the data flowing from digital equipment II, 44. Since the general purpose computer 12 may be programmed in different ways, various mathematical models of missile trajectories, or guidance and control systems may be analyzed and tested. The mathematical model may, for instance, contain the 6° of freedom equations necessary to completely simulate a missile's flight. The simulation may extend to test the efficiency and adequacy of flight computer designs.

The platform 24 of flight simulation table 10 is positioned physically by a gas jet reaction system mounted on platform 24. This gas jet reaction may be the attitude and control system of the missile guidance system under test and will be actuated in response to commands from the system. Since no motors or friction elements are present, the static friction and unbalance torques on the platform 24 may be adjusted to below 5 gm.-cm. or less. The gas jet reactions will position platform 24 about an air bearing in simulation of space position control.

The data link system has basically two modes of operation: one in which the flight computer 14 performs the major portion of the system calculation; the other mode is one where the general purpose computer 12 performs the major portion of the system calculations. In the first mode of operation, a relatively small amount of data will be transmitted to and from the platform 24 and with the exception of some monitoring and control signals, the flight computer 14 controls the test and is the terminal for both the transmitted and received data. In the second mode, computer 12 is made to control the test and the computer 14 cooperates with Dig. I, 34, to route data from the sensors to the computer 12.

In the first mode of the data link operation, the general purpose computer 12 is not a part of the operating loop and the transmissions of data from the platform 24 is between the computer 14, digital equipment I, 34, and II, 44, together with recording equipment 56. The flow of data may be controlled by the computer 14 or digital equipment II, 44.

In the event the computer 14 controls the flow of data, it commences by transmitting through digital equipment I, 34, to digital equipment II, 44, via the telemetry link 22. The digital equipment I, 34, arranges the data received from the computer 14 in the proper serial format and tacks on identification codes to the data to enable digital equipment II, 44, to properly sort out and route the data to the recording unit and/or the digital equipment IIa for real time display or control to the console 54. At the end of the transmission of data from the computer 14 and receipt thereof, the data received by digital equipment II, 44, the data information provided by the platforms gimbals, encoders and simulated star orientation sensors 50 may be sampled and recorded in test recording unit 56.

Upon completion of the transmission of data from the computer 14, the digital equipment II, 44, recognizes the end of the transmission and commences transmission of any data back to the computer 14 through digital equipment I, 34. The computer 14 must then either be in a receiving mode or have the ability to halt its operation in response to a signal from the digital equipment I, 34. The data transmitted by digital equipment II, 44, back to computer 14 may be data from the control console 54 and/or data from the gimbal encoders and star simulation sensors 50. The speed of transmission of data from the digital equipment II, 44, is controlled by a 100 kc. crystal oscillator. Special indentification markings are applied to the data to enable the computer 14 and/or the digital equipment I, 34, to sort out the data and use it to compute with or apply it to the proper outputs for control. Since the computer 14 is in communication with the guidance equipment under test, it is possible to communicate directly with and control the guidance equipment by means of this data link from the console 54.

In the second mode of operation where the general purpose computer 12 is a part of the computation cycle, the digital equipment II, 44, again forms an essential switching function to synchronize and coordinate the transmission of data to and from the various components of the data link.

The coordination of the flow of data is dependent upon the operating modes of the various computers 14 and 12 to be connected together. The digital equipment II, 44, may be arranged in this mode to control the flow of data by sending a request for information from the general purpose computer 12. This request is processed through digital equipment III, 46, which is specifically adapted to transform serially received data from digital equipment II, 44, into parallel information for the general purpose computer 12, and vice versa to transform the parallel information destined from computer 12 to the digital equipment II, 44, to serial format. Consequently, upon receipt by the computer 12 of the request for information, a response will be transmitted to digital equipment II, 44, which may then decode particular portions according to the controls on the console 54 in combination with the digital equipment IIa, 52. All the data received by digital equipment II, 44, is transmitted on to the computer 14 via digital equipment I, 34. Any data from the console or the gimbal table star sensors 50 may be tacked onto the end of the data received from the general purpose computer 12. The receipt of data in digital equipment I, 34, commences a receipt of data mode in the computer 14. When all of the data has been received, digital equipment I, 34, recognizes the end of transmission, informs the computer 14 thereof and if any information is to be transmitted from the computer 14 back to the general purpose computer 12, it may now be sent. This reply from the computer 14 is transmitted on to digital equipment II, 44, and again any console data or gimbal and simulated star sensor data 50 may be tacked onto the end of this transmission to enable the general purpose computer 12 to analyze the performance of the guidance system under test.

In the event the computer 14 operates synchronously and is unable to respond to random interruptions from digital equipment I, 34, the flow of data between this computer 14 and the general purpose computer 12 may be arranged by commencing with the transmission from the computer 14 to the general purpose computer 12 and immediately following with a receiving mode in the computer 14. In this case the general purpose computer 12 will be programmed to transmit immediately after it has received data and therefore is synchronized by proper programming to the flow of information along the data line. The tacking on of information from the console 54 or the gimbal sensors and the simulated star sensors 50 may be accomplished as previously mentioned in either direction.

While the novel testing system has been described in detail, it is obvious that numerous changes and modifications may be made in the construction and arrangements described without departing from the scope of the invention as hereinafter claimed.

I claim:

1. Testing apparatus for an inertial guidance system, including a stellar radiation sensor having an axis comprising, a member for supporting the guidance system, means mounting the member for rotation about a fixed point with three degrees of freedom, a source of simulated stellar radiation generally directed at said point, means mounting the sources for rotation with two degrees of freedom about said point at an appreciable distance therefrom, said simulated stellar source being rotatable about an axis substantially parallel to the polar axis of the earth, and means so mounting the stellar radiation sensor on the member that the stellar radiation sensor axis passes through said point to receive said simulated stellar radiation.

2. A device as recited in claim 1 and further comprising, transmitting means, receiving means responsive to the transmitting means independently of any mechanical connection therebetween, means mounting one of the transmitting and receiving means on the member, means for producting a first signal indicative of the position of the simulated stellar radiation relative to a predetermined inertial coordinate system, and means applying the signal to the transmitting and receiving means for transmittal to the inertial guidance system.

3. Testing apparatus for an inertial guidance system including in combination a member adapted to mount the guidance system, means comprising a fluid bearing for supporting the member with 3 degrees of freedom, a gimbal system, having three gimbals mounted to rotate about the member, autocollimating means mounted on a gimbal adjacent the member for sensing the attitude of the member relative to the adjacent gimbal to produce an error signal, means responsive to the error signal for driving the adjacent gimbal system to a corresponding position, and means providing a signal indicative of the position of the gimbal system.

4. A device as recited in claim 2 and further comprising, a gimbal system having three gimbals mounted to rotate about substantially the same fixed point and surrounding said member, means mounted on a gimbal adjacent the member for sensing the attitude of the member relative to the adjacent gimbal to produce an error signal, means responsive to the error signal for driving the adjacent gimbal to a corresponding attitude, means providing a second signal indicative of the attitude of the gimbal system, and wherein the means for applying the first signal also applies the second signal to the inertial guidance system.

5. A device as recited in claim 4 wherein the gimbal system comprises an inner roll gimbal, a pitch gimbal and a yaw gimbal and wherein the inner roll gimbal is the adjacent gimbal to closely follow the member.

6. A device as recited in claim 5 wherein the member position sensing means comprises an autocollimator system for sensing the relative roll, yaw, and pitch axis errors.

References Cited by the Examiner
UNITED STATES PATENTS

| | | | |
|---|---|---|---|
| 2,490,574 | 12/1949 | Austin | 73—1 |
| 2,700,888 | 2/1955 | Good et al. | 73—1 |
| 2,761,306 | 9/1956 | McNutt | 73—1 |
| 2,902,772 | 9/1959 | Ciscel | 33—226 |
| 3,018,653 | 1/1962 | Haley | 73—1 |
| 3,092,918 | 6/1963 | Haeussermann et al. | 35—43 |
| 3,164,978 | 1/1965 | Sharman et al. | 73—1 |

LEONARD FORMAN, *Primary Examiner.*

ISAAC LISANN, *Examiner.*

S. MATHEWS, *Assistant Examiner.*